United States Patent [19]

Blasbalg

[11] Patent Number: 4,829,934

[45] Date of Patent: May 16, 1989

[54] BIRD FEEDER

[76] Inventor: Morton L. Blasbalg, 22 River Rd., East Greenwich, R.I. 02818

[21] Appl. No.: 94,157

[22] Filed: Sep. 8, 1987

[51] Int. Cl.⁴ .............................................. A01K 39/00
[52] U.S. Cl. ................................................. 119/52 R
[58] Field of Search ................. 119/51 R, 52 R, 23, 119/24

[56] References Cited

U.S. PATENT DOCUMENTS

| | | | |
|---|---|---|---|
| 2,720,862 | 12/1953 | Davis | 119/51 R |
| 2,826,171 | 3/1958 | Piel | 119/51 R |
| 3,301,220 | 9/1965 | Queen | 119/51 R |
| 3,568,641 | 3/1971 | Kilham | 119/51 R |
| 4,188,913 | 2/1980 | Earl et al. | 119/51 R |
| 4,259,927 | 4/1981 | Clarke | 119/51 R |
| 4,328,765 | 5/1982 | Kilham | 119/51 R |
| 4,355,597 | 10/1982 | Blasbalg | 119/51 R |
| 4,628,865 | 12/1986 | Lehmann | 119/52 R |

FOREIGN PATENT DOCUMENTS 989920 11/1963 United Kingdom ............. 119/52 R

Primary Examiner—Gene Mancene
Assistant Examiner—R. Thomas Price
Attorney, Agent, or Firm—Salter & Michaelson

[57] ABSTRACT

A bird feeder assembly includes a cylindrical tubular bird feeder unit of a type which is adapted to be normally suspended from an overhead supporting structure and a base unit which is detachably receivable on the lower end portion of the feeder unit for adapting it to be mounted on a supporting pole or post. The base unit is engageable with a perch on the feeder unit for detachably securing the base unit on the feeder unit, and the base unit includes an outwardly extending dish member for catching bird feed which is spilled from the feeder unit.

1 Claim, 2 Drawing Sheets

BIRD FEEDER

BACKGROUND AND SUMMARY OF THE INVENTION

The instant invention relates to bird feeding apparatus and more particularly to a bird feeder assembly having a detachable base unit.

Bird feeders of the general type comprising a cylindrical, tubular container member having at least one feeding aperture therein and a perch member which extends outwardly from the container member beneath the feeding aperture have been generally known for a number of years. In this regard, in use, bird feeders of this general type are normally suspended from trees or other supporting structures so that they are maintained in upwardly spaced relation to the adjacent ground in order to make them relatively inaccessible to squirrels and other rodents. However, it has been found that bird feeders of this general type are not normally readily adaptable to be alternatively mounted on supporting poles or similar mounting structures; and, accordingly, heretofore it has generally not been possible to mount bird feeders of this general type in open field areas without the use of specially fabricated supporting structures.

The instant invention provides an effective bird feeder assembly comprising a bird feeder unit of the general type which is adapted to be suspended from an overhead supporting structure, such as a tree, and a base unit which is detachably securable on the bird feeder unit for adapting the bird feeder unit to be alternatively mounted on a pole or a mounting post. More specifically, the bird feeder unit comprises a substantially cylindrical tubular container member which is operative for containing a supply of bird feed therein, the container member having at least one side aperture therein which is spaced upwardly from the lower end thereof for dispensing bird feed to birds feeding from the feeder unit. The bird feeder unit further comprises a perch which projects outwardly from the container member beneath the feeding aperture for supporting a bird while the bird is feeding from the bird feeder unit. The base unit comprises a tubular main sleeve member which is adapted and dimensioned for receiving the lower end portion of the container member therein so that the main sleeve member engages the perch to releasably maintain the sleeve member on the container member, and a mounting post which extends downwardly from the main sleeve member so that it is securable to a mounting pole or a similar structure. The sleeve member preferably has a slot formed therein having a downwardly extending first portion which extends downwardly from the upper end of the sleeve member and a second portion which extends in a substantially horizontal disposition from the first portion, and the sleeve member is constructed so that the perch is receivable in the second substantially horizontal portion of the slot to releasably lock the sleeve member on the container member. The base unit preferably further comprises a dish member including a substantially circular tray portion and a tubular portion which projects upwardly from the central portion of the tray portion. The main sleeve member and tubular portion of the dish member preferably each have a pair of diametrically opposed apertures formed therein, and the tubular portion of the dish member is formed so that it is receivable on the main sleeve member with the apertures in the main sleeve member and the apertures in the tubular portion of the dish member in substantially aligned relation. The base unit preferably further comprises a perch pin which is receivable through the apertures in the main sleeve member and the apertures in the tubular portion of the dish member for securing the dish member to the main sleeve member, and for providing a secondary perch on the feeder assembly which is positioned adjacent the dish member.

For use and operation of the feeder assembly of the instant invention, the base unit is detachably securable on the lower end portion of the feeder unit to enable the feeder assembly to be effectively mounted on a mounting structure, such as a pole or the like. In this regard, the base unit is engageable with a perch adjacent the lower end of the feeder unit for securing the base unit to the feeder unit in a manner which allows the feeder unit to be easily removed from the base unit for filling. Further, the dish member provides a convenient means for catching seeds or the like which have spilled from the feeder unit, and the perch pin provides an effective secondary perch for birds which are feeding from the dish member, as well as providing an effective means for detachably securing the dish member to the main sleeve member.

Accordingly, it is a primary object of the instant invention to provide a bird feeder assembly which includes a feeder unit comprising a substantially cylindrical, tubular container member, and a base unit which is detachably securable on the lower end portion of the feeder unit for mounting the feeder unit on a mounting pole or the like.

Another object of the instant invention is to provide a bird feeder assembly comprising a feeder unit of a type which is adapted to be normally suspended from a supporting structure, such as a tree, and a base unit which is detachably receivable on the lower end portion of the feeder unit for mounting the feeder unit on a mounting pole or the like.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
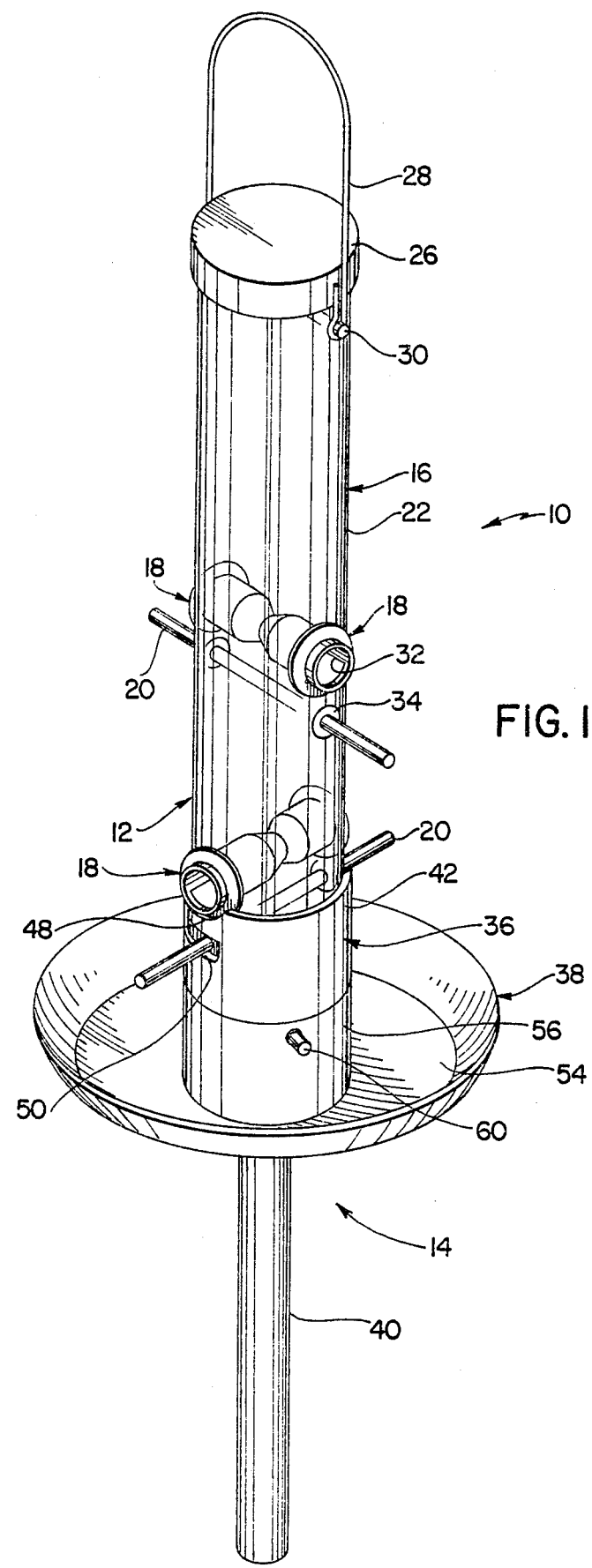
FIG. 1 is a perspective view of the bird feeder assembly of the instant invention.
Figure 2:
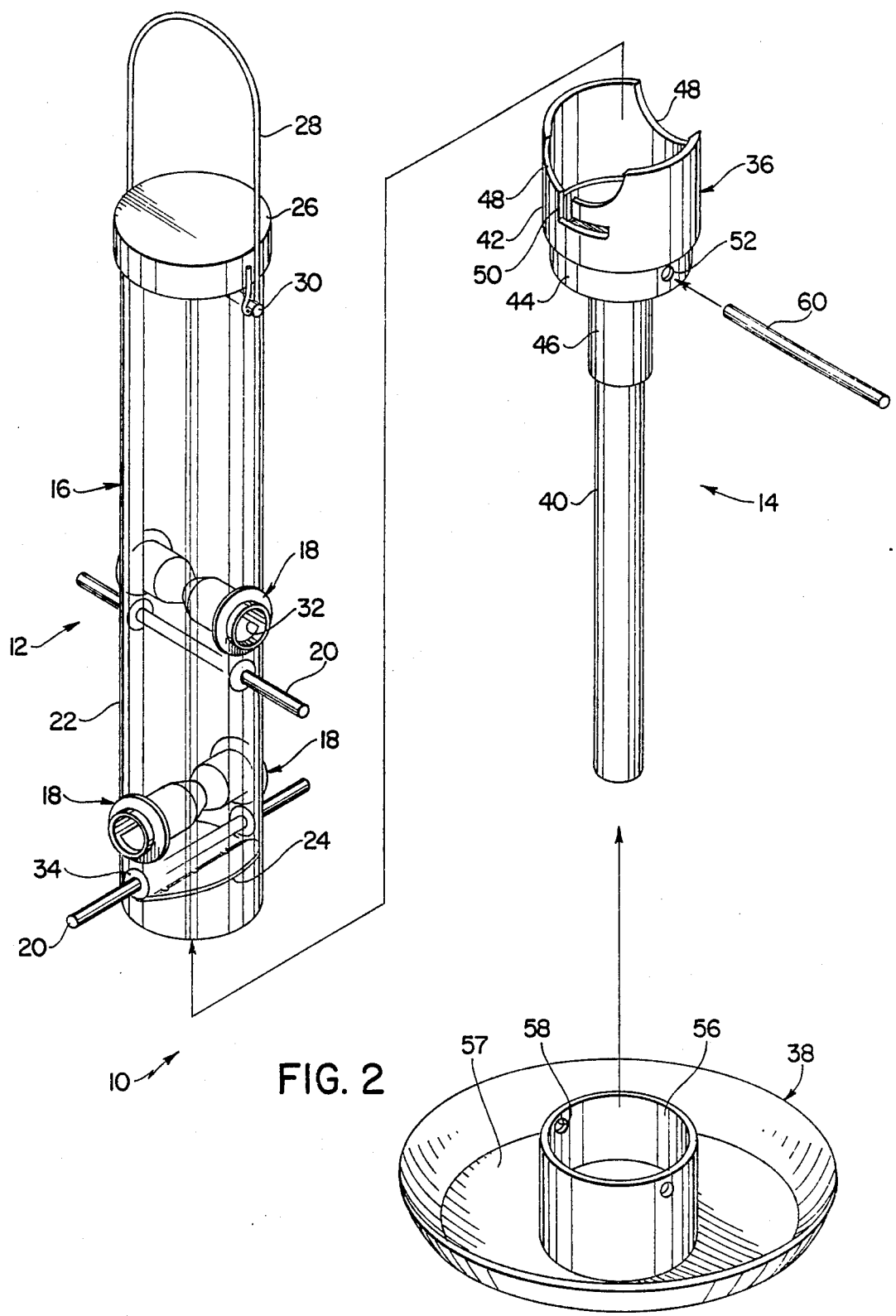
FIG. 2 is a partially exploded perspective view of the bird feeder assembly.

Referring now to the drawings, the bird feeder assembly of the instant invention is illustrated and generally indicated at 10 in FIGS. 1 and 2. The bird feeder assembly 10 comprises a feeder unit generally indicated at 12 and a base unit generally indicated at 14 which is detachably securable on the lower end portion of the feeder unit 12 for adapting the feeder unit 12 to be mounted on a mounting pole or a similar structure.

The feeder unit 12 is of generally conventional construction, and it comprises a substantially tubular, cylindrical container member generally indicated at 16, a plurality of feeder ports generally indicated at 18 which are received in the container member 16 so that they define side feeding apertures therein, and a plurality of perch elements generally indicated at 20.

The container member 16 comprises a tubular sidewall portion 22, a bottom wall portion 24, a cap 26, and a hanger member 28. The sidewall portion 22 is preferably made from a suitable transparent plastic material so that the level of bird feed in the container member 16 can be easily observed, and the bottom wall 24 is received in the tubular sidewall portion 22 adjacent the lower end thereof for obstructing the lower end of the sidewall portion 22. The cap 26 is preferably cast from a suitable corrosion-resistant metal, and it is preferably adapted to be removably but snugly received on the upper end of the side wall portion 22 so that the cap 26 is normally retained on the sidewall portion 22 but so that it can be removed for filling the container member 16. The hanger member 28 is preferably made from a suitable wire and it is pivotally secured to the sidewall portion 22 with a pin 30 which extends diametrically through the sidewall portion 22 to enable the hanger member 28 to be utilized for suspending the feeder unit 16 in a conventional manner.

The feeder ports 18 are also preferably of conventional construction, and they are assembled in pairs so that they extend inwardly in the container member 16 from diametrically opposite sides thereof. The feeder ports 18 are of generally tubular construction, and they are formed with downwardly facing openings 32 therein so that birds can obtain bird feed, such as seeds and the like, from the container member 22 through the ports 18, but so that substantial quantities of bird feed do not normally otherwise pass outwardly through the ports 18. The feeder unit 12 as herein embodied includes two pairs of feeder ports 18 which define four side feeding apertures in the feeder unit 12, two of which are spaced upwardly from the lower end of the wall portion 22 and two of which are positioned at approximately the midpoint in the vertical extent of the container member 16.

The perch elements 20 comprise elongated, cylindrical metallic pins which are assembled in the feeder unit 12 so that they project outwardly from opposite sides thereof beneath the ports 18. In this connection, the lowermost ports 18 and the lowermost perch element 20 are positioned on the container member 16 so that the lowermost perch element 20 is spaced downwardly from the adjacent ports 18 but nevertheless spaced upwardly slightly from the lower end of the container member 16. The perch elements 20 are retained in assembled relation with the container member 16 with frictional retainer rings 34 which engage the pins 20 to prevent them from sliding through the container member 16.

The base unit 14 comprises a main sleeve member generally indicated at 36, a dish member generally indicated at 38, and a post 40.

The sleeve member 36 is preferably integrally molded from a suitable durable plastic material, and it includes a cylindrical tubular upper portion 42, a slightly reduced neck portion or intermediate portion 44, and a power socket portion 46. The upper portion 42 is dimensioned for snugly but removably receiving the lower portion of the container member 16 therein, and it includes a pair of diametrically opposed, rounded, downwardly extending notches 48 therein and a pair of slots 50 which extend downwardly from the notches 48 and then substantially horizontally, i.e., in substantialy transverse relation to the longitudinal extent of the sleeve member 36. The intermediate portion 44 has a slightly reduced diameter relative to the upper portion 42 and it extends downwardly a short distance from the tubular upper portion 42. A pair of diametrically opposed apertures 52 are formed in the intermediate portion 44, and the socket portion 46 which has a further reduced diameter extends downwardly from the intermediate portion 44. The socket portion 46 is formed in a tubular construction, and it is dimensioned for snugly receiving the post 40 therein.

The post 40 preferably comprises a tubular pipe section made of a suitable corrosion-resistant metal, and it is preferably secured in the socket portion 46 with a set screw (not shown), or with other suitable conventional fastening means. The post 40 is receivable on a mounting pole of smaller diameter or in a mounting pole of larger diameter for easily but effectively mounting the feeder assembly 10 thereon.

The dish member 38 is preferably also integrally molded from a suitable durable plastic material, and it comprises a substantially circular dish-shaped tray portion 54 and a tubular portion 56 which extends upwardly from the tray portion 54. In this connection, the tubular portion 56 in effect defines an enlarged central aperture in the tray portion 54, and it is dimensioned to be snugly received on the intermediate portion 44 of the main sleeve member 36. The tubular portion 66 is formed with a pair of diametrically opposed apertures 58 therein which are receivable in aligned relation with the apertures 52, and a perch pin 60 which is similar to the perch elements 20 is receivable through the apertures 52 and 58 so that it extends outwardly a distance on each side of the sleeve portion 56 to secure the dish member 38 to the main sleeve member 36 and to provide a secondary perch for supporting birds which are feeding from the feeder assembly 10.

For use and operation of the bird feeder assembly 10, the base unit 14 is assembled on the lower end portion of the feeder unit 12 to enable the bird feeder unit 12 to be mounted on a pole or the like, rather than suspended from an overhead supporting structure, such as a tree. In this regard, the upper portion 42 of the sleeve member 36 is adapted to be snugly received on the lower end portion of the container member 16 for supporting the feeder unit 12, and the lowermost perch element 20 is receivable in locked relation in the slots 50 by first passing the opposite end portions of the lowermost perch element 20 downwardly through the vertical portions of the slots 50 and then rotating the base unit 14 so that the opposite end portions of the perch element 20 are received in the substantially horizontal or transversely extending portions of the slots 50. During this procedure, the rounded notches 48 provide clearance for the lowermost feeder ports 18 to enable the lowermost perch element 20 to be assembled in the slots 50. When the base unit 14 is assembled with the feeder unit 12 in this manner, the dish member 38 provides an effective tray for catching seeds which are spilled from the feeder ports 18, and the post element 40 projects downwardly from the socket portion 46 for securing the feeder assembly 10 to a mounting pole or a similar supporting structure. However, because of the manner in which the feeder unit 12 is releasably secured to the base unit 14, the feeder unit 12 can be easily removed from the base unit 14 for filling.

It is seen therefore that the instant invention provides an effective bird feeder assembly which has specific advantages over many of the heretofore available bird feeders. In particular, the base unit 14 is adapted for mounting the feeder unit 12 on a mounting pole or similar structure so that the feeder unit 12 can be mounted in various open areas, such as open fields or the like. Further, the feeder unit 12 can be easily removed from the base unit 14 for filling, and alternatively it can be utilized independently of the base unit 14 by suspending it from a structure, such as a tree or the like. Accordingly, for these reasons, as well as the other reasons hereinabove set forth, it is seen that the feeder assembly of the instant invention represents a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept an that the same is not limited to the particular forms herein shown and described except insofar as indicated by the scope of the appended claims.

What is claimed:

1. A bird feeder assembly comprising a bird feeder unit and a base unit, said bird feeder unit comprising a substantially cylindrical tubular container member operative for containing a supply of bird feed therein, said container member having upper and lower ends and having at least one side feeding aperture therein which is spaced upwardly from said lower end, and a perch projecting outwardly from said container member between said feeding aperture and said lower end, said base unit comprising a tubular sleeve member, the lower end portion of said container member being received in said sleeve member, said sleeve member engaging said perch having an upper end and having a slot formed therein which extends downwardly from said upper end thereof, said perch being releasably received in said slot, the portions of said sleeve member which define said slot engaging said perch to releasably retain said sleeve member on said container member, said slot including a first portion which extends downwardly from the upper end of said sleeve member and a second portion which extends from said first portion in a substantially transverse relation thereto, said perch being received in said second slot portion for releasably locking said sleeve member on said container member.

* * * * *